(No Model.)
T. E. BADEN.
AUTOMATIC BRAKE FOR SEWING MACHINES.
No. 267,968. Patented Nov. 21, 1882.
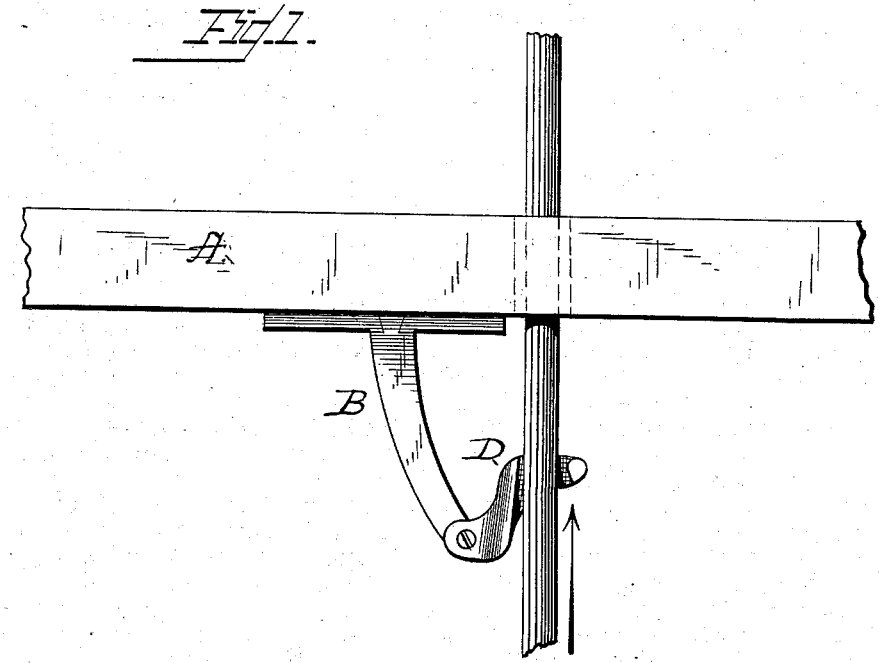
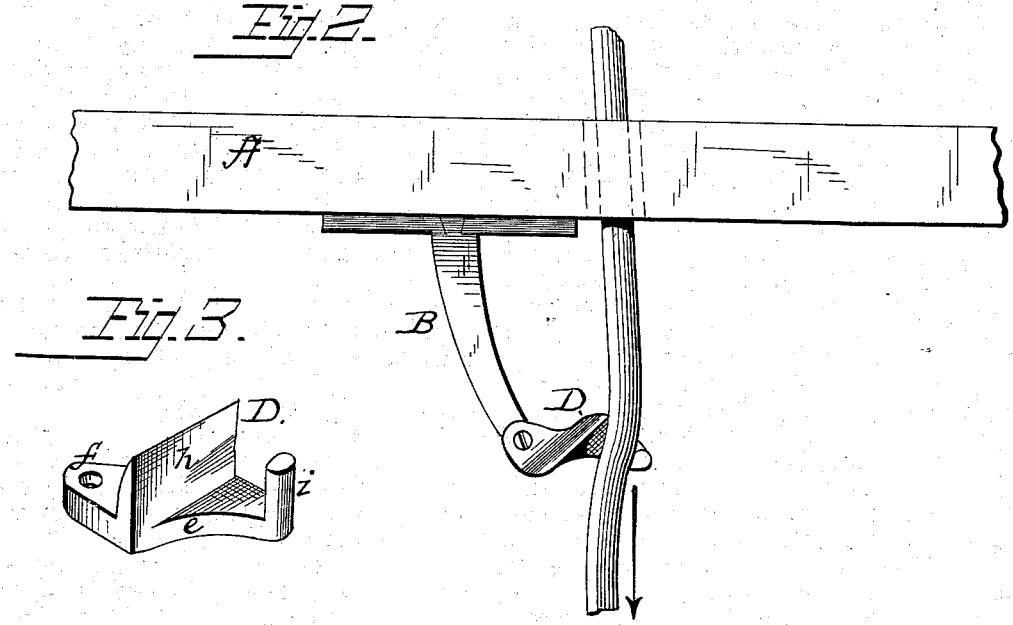
WITNESSES
INVENTOR
Thos. E. Baden.
by Heylmunt & Kane
Attorneys.

UNITED STATES PATENT OFFICE.

THOMAS E. BADEN, OF WASHINGTON, DISTRICT OF COLUMBIA, ASSIGNOR OF ONE-HALF TO M. J. WINE, OF SAME PLACE.

AUTOMATIC BRAKE FOR SEWING-MACHINES.

SPECIFICATION forming part of Letters Patent No. 267,968, dated November 21, 1882.

Application filed July 11, 1882. (No model.)

*To all whom it may concern:*

Be it known that I, THOMAS E. BADEN, a citizen of the United States of America, residing at Washington, in the District of Columbia, have invented certain new and useful Improvements in Automatic Brakes for Sewing-Machines; and I do hereby declare the following to be a full, clear, and exact description of the invention, such as will enable others skilled in the art to which it appertains to make and use the same.

This invention relates to improvements in automatic belt-brakes for sewing-machines; and it has for its object to provide a more simple and effective device to prevent motion of the driving-wheel in the wrong direction.

Heretofore numerous devices having the same object in view as contemplated by my invention have been used, but in none of them is the distinguishing characteristic of my improvements embraced in them—to wit, the free passage of the driving-belt between opposing jaws without exerting a constant pressure upon the belt, to the injury of the same, and causing injurious effect upon the person operating the machine, and to secure a quick automatic action upon the belt.

My invention therefore consists in the peculiarly-constructed brake working on an axis and formed with opposite walls and an intermediate space for the passage of the belt, whereby a reverse or wrong motion of the belt will cause the brake to automatically clamp or bite the belt and stop further motion of the machine in the wrong direction.

In the annexed drawings, forming a part of this specification, Figure 1 is a side view of my improved automatic belt-brake attached to the under side of a sewing-machine table, showing the belt as moving in the right direction. Fig. 2 is a similar view, showing the belt as moving in the wrong direction and the brake biting the belt, and Fig. 3 is a perspective view of the brake device detached from the bracket.

In the annexed drawings, the letter A indicates a portion of a sewing-maching table, to the under side of which the bracket B is secured by screws or other fastening means. To the lower and outer end of this bracket B is attached the belt-brake D by means of a pin or rivet, serving also as an axis for the brake to work upon. This belt-brake consists of the curved body $e$, the attaching-lug $f$, the side wall, $h$, and the side arm, $i$, all made in one piece, as shown in Fig. 3 of the drawings. The side wall, $h$, and round arm $i$ should be of sufficient length and opposite each other, with an intermediate space for the free passage of the belt. The perforation in the lug $f$ of the brake and the perforation in the lower end of the bracket for receiving the connecting pin or rivet may be made at the time of casting these parts. It is obvious that these belt-brakes can be constructed "right" and "left" and be applied to either side of the bracket to suit circumstances and different machines.

The device is attached to the under side of a sewing-machine table so that one side or portion of the belt will pass between the jaws $h$ and $i$ of the brake, as indicated.

In the operation or starting of the sewing-machine, whenever the driving-belt revolves in the wrong direction the belt will act upon the brake and cause the same to automatically grip the belt between its jaws and prevent further movement in this direction, as indicated in Fig. 2 of the drawings.

A belt-brake of this construction, and working on an axis, is very sensitive and quick in action.

I reserve the right to vary the construction and arrangement of parts without departing from the spirit of the invention.

What I claim as my invention, and desire to secure by Letters Patent, is—

1. An automatic belt-brake for a sewing-machine, constructed with opposing surfaces and an intermediate space for the passage of the belt, and working on an axis, substantially as described.

2. As an improved article of manufacture, the automatic belt-brake consisting of the curved body $e$, lug $f$, and the jaws $h$ $i$, made in one piece, substantially as described.

In testimony whereof I affix my signature in presence of two witnesses.

THOS. E. BADEN.

Witnesses:
J. M. YZNAGA,
D. D. KANE.